July 29, 1941.　　　R. K. LE BLOND　　　2,250,640
POSITION INDICATING MEANS FOR TAILSTOCKS
Filed July 18, 1939　　　2 Sheets-Sheet 1
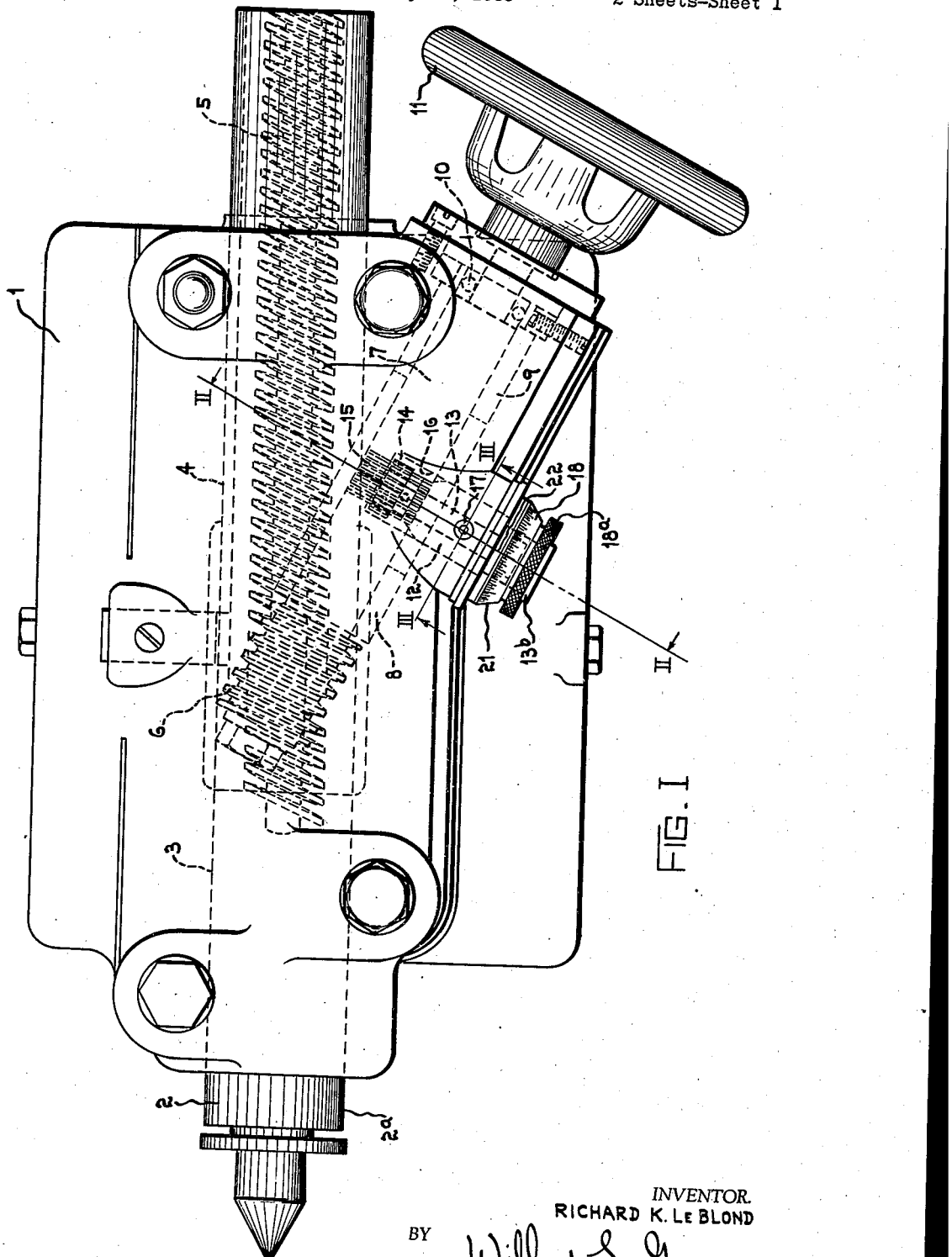
INVENTOR.
RICHARD K. Le BLOND
BY Willard S. Greene
ATTORNEY.

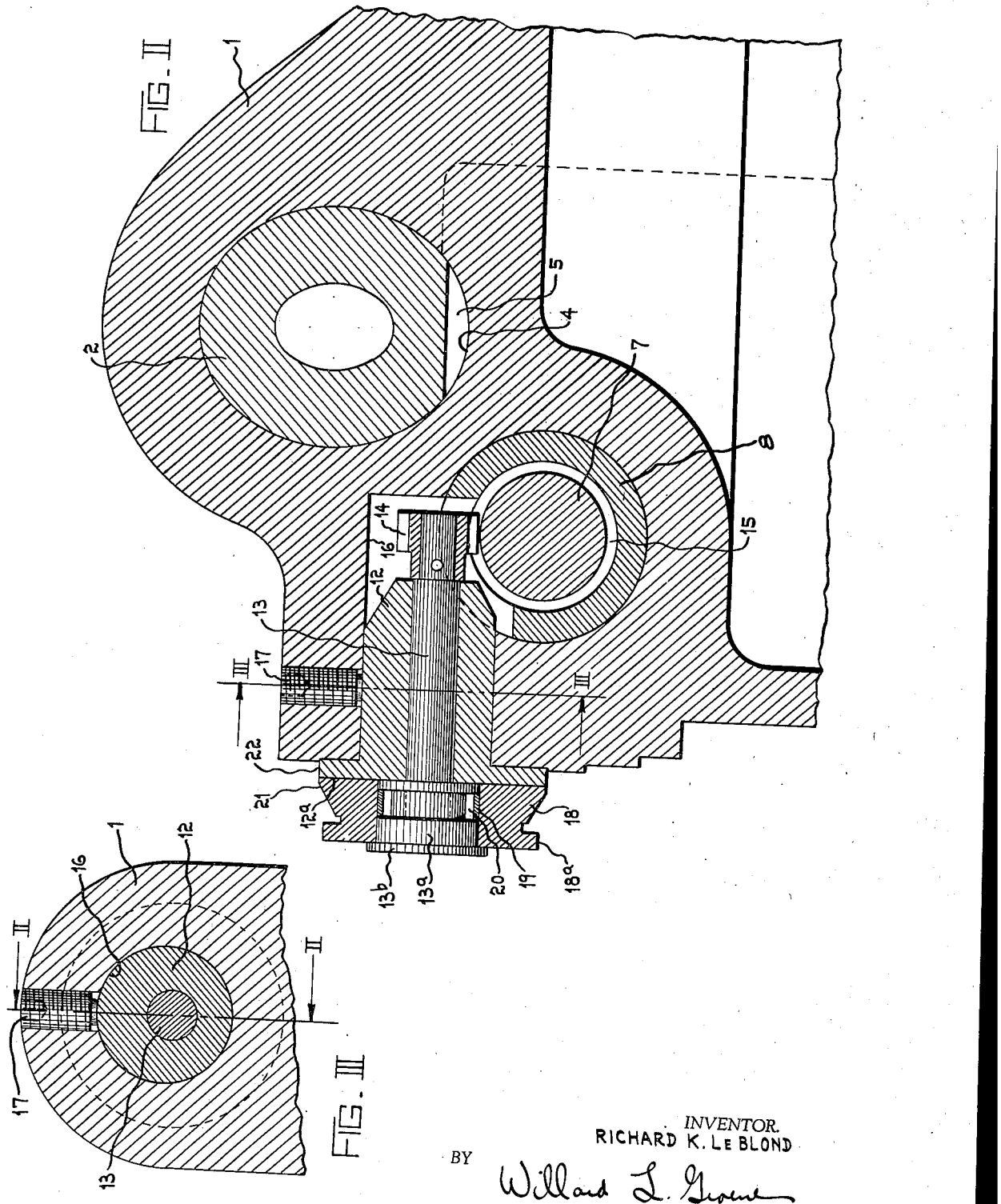

Patented July 29, 1941

2,250,640

UNITED STATES PATENT OFFICE 2,250,640

POSITION INDICATING MEANS FOR TAILSTOCKS

Richard K. Le Blond, Cincinnati, Ohio, assignor to The R. K. Le Blond Machine Tool Company, Cincinnati, Ohio, a corporation of Delaware Application July 18, 1939, Serial No. 285,097

4 Claims. (Cl. 82—31)

My invention relates to machine tools and is particularly directed to improved means for indicating the position of the barrel of tailstocks for lathes and the like when using said tailstock for drilling, reaming, and tapping, etc.

In the past the method of indicating the position of the tailstock barrel was to graduate the periphery of the barrel so that its projection from the tailstock housing as shown by the graduations indicated the extent of travel of the barrel. This method of indication is not satisfactory because:

(a) Direct reading of the amount of travel cannot be had because the graduations are partially covered up by the tailstock housing.

(b) Graduations are cut on the barrel so that they are not movable relative thereto for setting to zero for direct reading of extent of travel of the barrel.

(c) Graduations on the periphery of barrel become scratched and marred and covered with lubricant and dust as barrel is moved in and out of housing making them difficult to read.

(d) Accuracy of setting of the barrel cannot be had because of the limitation of placing the graduations sufficiently close together on the barrel. There is no way of amplifying the movement of the graduations to effect accurate indication of the movement of the barrel.

(e) The movement indicating means comprising the graduations on the barrel, particularly on large tailstocks, is not closely associated with the operating handwheel of the tailstock so that difficulty is experienced in simultaneously operating the handwheel and watching the graduations on the tailstock barrel.

With these defects of former arrangements clearly in mind, I have conceived of an arrangement for clearly, conveniently and accurately indicating the movement of a tailstock barrel.

One object is to provide a dial indicating mechanism which is entirely independent of the tailstock barrel but which is operated in relation to its movement by the operating means for actuating the tailstock so as to indicate the movement of the tailstock barrel.

Another object is to provide an indicating means for the movement of a tailstock barrel which is highly sensitive to minute movements of the barrel.

Another object is to provide an indicating means for the movement of a tailstock barrel which is closely and conveniently associated with the operating handwheel.

Further features and advantages of my invention will appear from the following detailed description of the drawings in which:

Figure I is a plan view of a lathe tailstock embodying the principles of my invention.

Figure II is a vertical section through the tailstock of Figure I on the line II—II of that figure and Figure III.

Figure III is a vertical section on the line III—III of Figures I and II.

In the tailstock housing 1 of the tailstock is slidably mounted the tailstock barrel 2 in suitable bearings 3 and 4. On the bottom of the barrel 2 is cut a rack 5 which is engaged by a worm 6 on the actuating shaft 7 which shaft is angularly disposed relative to the axis of the barrel 5 and suitably journaled in bearings 8, 9, and 10 in the housing 1. On the end of the shaft 7 is mounted the manipulating handwheel 11 whereby the shaft may be rotated to effect longitudinal movement of the barrel 2.

In the eccentric bushing 12 is journaled the dial shaft 13 which has a worm wheel 14 fixed on its inner end engaged by the worm 15 cut on the shaft 7 so that rotation of the shaft 7 causes relatively slower rotation of the dial shaft 13 in a predetermined relationship to the shaft 7 and the movement of the barrel 2. The eccentric bushing 12 is mounted in the bore 16 of the housing 1 and may be rotated therein to effect engagement of the worm wheel 14 and the worm 15 so that no back-lash will exist between these members. This bushing 12 may be locked in adjusted position by the set screw 17 threaded in the housing 1.

Rotatably mounted on the enlarged bearing portion 13a of the dial shaft 13, and confined axially thereof by the integral flange 13b of the shaft 13 and the face 12a of the bushing 12, is the graduated collar 18 which may be rotated on the portion 13a for setting to zero by means of the knurled portion 18a but which is normally driven, through the friction springs 19 carried in the annular groove 20 in the portion 13a, by the dial shaft 13 when the handwheel 11 is operated.

On the beveled surface 21 of the collar 18 may be provided graduations as precise as one thousandth of an inch if desired, the relationship between the worm wheel 14 and the worm 15 be accordingly arranged for this purpose. These graduations may be conveniently read with regard to a suitable reference line 22 on the bushing 12. It is to be further noted that this collar 18 is conveniently positioned near the hand wheel 11 so that the operator need not have to try to manipulate the handwheel 11 while examining graduations on the tailstock barrel at 2a as is inconveniently necessary in former devices. Also, by means of the multiplying ratio between the worm wheel 14 and the worm 15, accurate and precise movements can be effected in the tailstock barrel 2.

Having thus fully set forth and described my invention, what I claim and desire to secure by United States Letters Patent is:

1. In a tailstock for lathe, a housing, a barrel slidably mounted in said housing, an actuating shaft in said housing angularly disposed relative to said barrel, a worm on said shaft adapted to engage a rack on said barrel, a handwheel mounted on said shaft, a dial shaft journaled in said housing perpendicular to said hand wheel shaft, a worm wheel on said dial shaft, a worm on said actuating shaft arranged to drive said worm wheel in a predetermined relation to the movement of said barrel, and dial indicating means on said dial shaft for indicating the movement of said barrel.

2. In a tailstock for lathe, a housing, a barrel slidably mounted in said housing, an actuating shaft in said housing angularly disposed relative to said barrel, a worm on said shaft adapted to engage a rack on said barrel, a handwheel mounted on said shaft, a dial shaft journaled in said housing angularly related to said barrel of said handwheel shaft, a worm wheel on said dial shaft, a worm on said actuating shaft arranged to drive said worm wheel in a predetermined relation to the movement of said barrel, means for accurately setting the worm wheel on said dial shaft in relation to the worm on said actuating shaft so as to eliminate all back lash therebetween, and dial indicating means on said dial shaft for indicating the movement of said barrel.

3. In a tailstock for lathe, a housing, a barrel slidably mounted in said housing, an actuating shaft in said housing angularly disposed relative to said barrel, a worm on said shaft adapted to engage a rack on said barrel, a handwheel mounted on said shaft, a dial shaft journaled in said housing perpendicular to said worm shaft, a worm wheel on said dial shaft, a worm on said actuating shaft arranged to drive said worm wheel in a predetermined relation to the movement of said barrel, means for accurately setting the worm wheel on said dial shaft in relation to the worm on said actuating shaft so as to eliminate all back lash therebetween, and dial indicating means manually adjustable on said dial shaft for indicating the movement of said barrel.

4. A tailstock comprising a housing, a barrel mounted for axial movement in said housing, a rack on said barrel, a worm operatively engaging said rack, a worm shaft journaled in said housing in a plurality of bearings, the axis of said worm shaft being angularly disposed relative to the axis of said spindle, a handwheel connected to said worm shaft for rotating said shaft, a dial shaft journaled in an eccentric bushing carried in said housing in angularly related position relative to said worm shaft, a worm wheel on said dial shaft, a worm on said actuating shaft arranged to drive said worm wheel in a predetermined relation to the movement of said barrel, means for adjusting said bushing so as to eliminate all back lash between said worm wheel on said dial shaft and the worm on said worm shaft, and dial indicating means manually adjustable on said dial shaft for indicating the movement of said barrel located in close adjacency to said handwheel.

RICHARD K. LE BLOND.